(12) United States Patent
Onogi

(10) Patent No.: US 6,494,798 B1
(45) Date of Patent: Dec. 17, 2002

(54) PULLEY PRESS CONTROLLING APPARATUS USING AN ELASTIC MEMBER FOR BELT TRANSMISSION

(75) Inventor: Kenkichi Onogi, Tokyo (JP)

(73) Assignee: Tokyo Automatic Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/708,461

(22) Filed: Nov. 9, 2000

(30) Foreign Application Priority Data

Nov. 13, 1999 (JP) .......................................... 11-359669

(51) Int. Cl.$^7$ .............................................. F16H 61/00
(52) U.S. Cl. .......................................... 474/28; 474/18
(58) Field of Search .............................. 474/11, 18, 28; 477/44, 45, 46, 48

(56) References Cited

U.S. PATENT DOCUMENTS

| 5,180,339 | A |   | 1/1993 | Haley et al. |   |
|---|---|---|---|---|---|
| 6,120,400 | A | * | 9/2000 | Onogi | .......................... 474/46 |
| 6,219,608 | B1 | * | 4/2001 | Abo et al. | ..................... 701/51 |
| 6,243,638 | B1 | * | 6/2001 | Abo et al. | ..................... 701/51 |

FOREIGN PATENT DOCUMENTS

| EP | 0 293 487 | * | 7/1988 | ........... F16H/55/36 |
| EP | 0 931 960 A2 | * | 7/1999 | ........... F16H/61/00 |
| JP | 9-217819 A |   | 8/1997 |   |
| JP | 10-321246 A |   | 12/1998 |   |
| JP | 2000-193075 | * | 7/2000 | ........... F16H/61/02 |

* cited by examiner

Primary Examiner—David A. Bucci
Assistant Examiner—Timothy McAnulty
(74) Attorney, Agent, or Firm—Rothwell, Figg, Ernst & Manbeck

(57) ABSTRACT

A frictional transmission comprising a pressurizing device for applying an elastic pressurizing force generated by compressing and pressing an elastic member in series by a compression device when a belt is pressed and controlled through the elastic member, a condition detector for obtaining a detected value of the friction force and the revolution number, an operating device for suitably creating the pressurizing force, and a control device for always calculating a deviation between a selected valve and a detected value of the predetermined pressurizing force, the control device achieves both or one of error compensation generated in the elastic member or the belt and strengthening adjustment of the additional function by a programmable control.

21 Claims, 9 Drawing Sheets

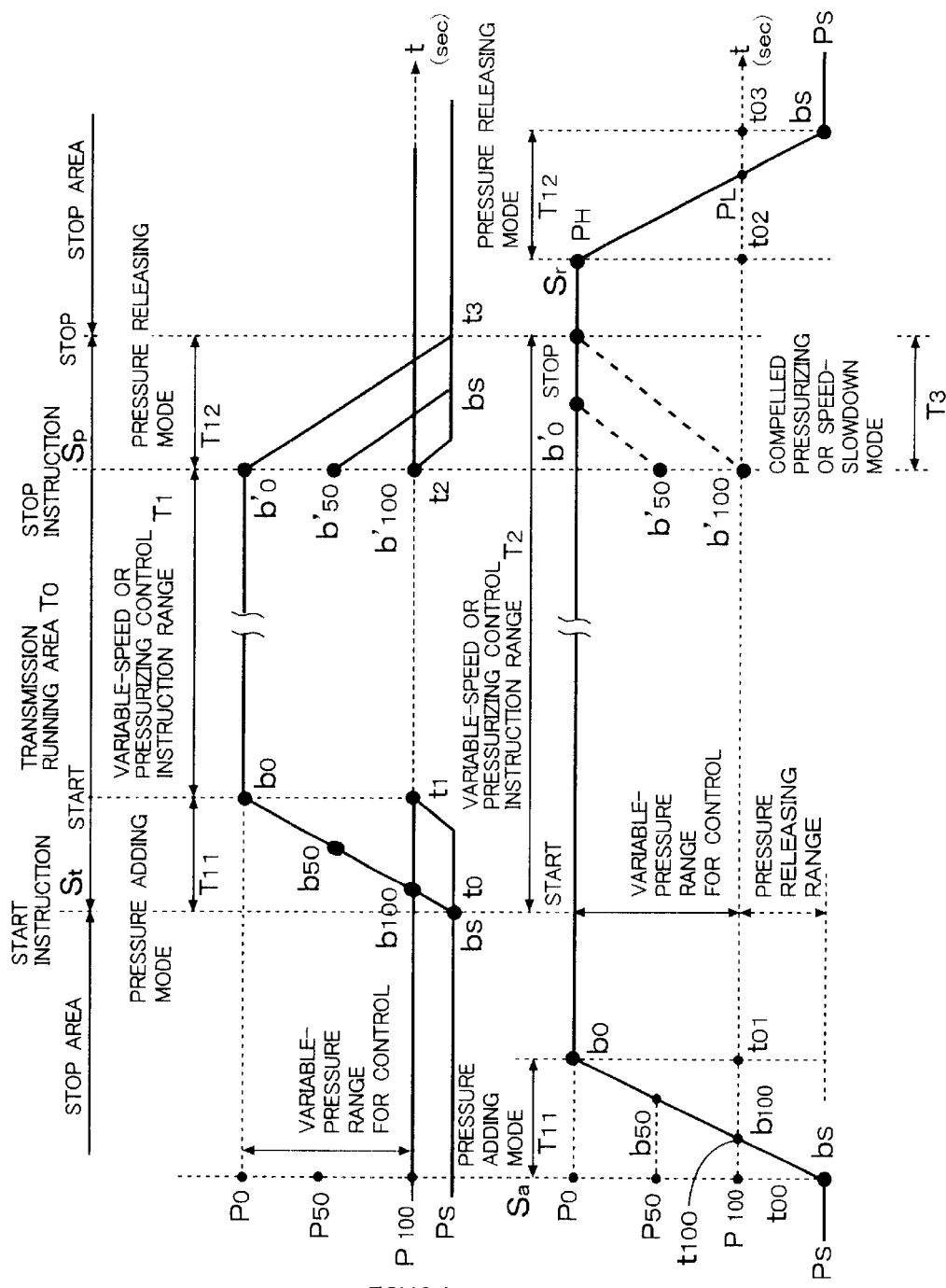

$L_{02} = L_B - L_A$
$L_0 = L_{01} + L_{02} + L_{03}$

TO I/O
VALVE & OIL PUMP

PULLEY PRESS CONTROLLING APPARATUS USING AN ELASTIC MEMBER FOR BELT TRANSMISSION

BACKGROUND OF THE INVENTION

The present invention relates to a pulley press controlling apparatus using an elastic member in which a pressurizing force and an elastic force corresponding thereto are always simultaneously applied from outside to a frictional transmission surface between a pulley and a belt transmission in a continuously variable speed transmission or a constant speed ratio transmission to stably maintain the accuracy of the elastic press and so on over a long period of time.

The idea for directly and hydraulically supplying and controlling an external pressurizing force to a secondary pulley having a belt transmission member held between two disks is well-known from, for example, such as Japanese Patent Application Laid-Open No. Hei 9 (1997)-217819 or U.S. Pat. No. 5,180,339. The greatest feature of prior art of this kind lies in that a hydraulic pressurizing device and an elastic member are pressed and disposed in parallel to each other with respect to a secondary pulley disk to be pressed. That is, because of the parallel disposition, respective pressurizing means directly press the secondary pulley independently. This has a decisive defect with respect to the frictional transmission for the following reason. That is, the horse power P fed by the pulley to the load is normally expressed by the following equation between the revolution number N and the torque T:

$$P[W] = 1.027 \times N[\text{rpm}] \times T[\text{kgm}] \quad (1)$$

Accordingly, it is necessary for the transmission of a fixed horse power $P_c$ to reduce a torque T of a belt when the revolution number N increases, and conversely increase the torque T when the revolution number N reduces. In the prior art, inverse proportional pressure is applied to the secondary pulley by a hydraulic pressurizing device, but since there is present no elastic force in fluid pressure itself, in control of internal pressure of a hydraulic valve, an elastic member is used to suppress the disturbance of internal pressure generated every change-over or switching.

Then, the using state of the elastic member will be mentioned referring to FIG. 6. Even if the hydraulic pressurizing device should realize the inverse characteristic A between the pressurizing force to the secondary pulley and the revolution number, the elastic force of the elastic member merely comprises the direct proportional characteristic D. Accordingly, this means that the elastic force is applied to the pressurizing force merely by a point of intersection F between the characteristics A and D, but in points other than the point of intersection F, the elastic force rarely contributes to transmission. The fact that the elastic force is not present in the frictional transmission surface despite the presence or absence of variable speed indicates that the momentary return into the stable transmission caused by the self settling function for pressurizing and absorbing shock vibrations between the pulley and the belt and the automatic aligning function fails to be achieved. Therefore, since in the frictional transmission surface, the state of surplus press or lack in press is repeated every disturbance, there poses a disadvantage that consumption of the frictional surface is accelerated, resulting in disablement of transmission in a short period of time.

The present applicant has made a proposal, in Japanese Patent Application No. Hei 10 (1998)-321246, in which an elastic pressurizing force generated by pressurizing a compression device and an elastic device in series with each other is applied to a secondary pulley. However, positive application of the elastic force of the elastic member to the friction transmission causes an advantage and a disadvantage present simultaneously. The advantage includes stabilization of transmission for a long period of time, and high-speed control responsiveness. The disadvantage includes a huge dimension of and a large-size of the elastic member, disturbance of process accuracy in manufacture of compression displacement to pressurizing force, variation of pressurizing characteristic caused by deformation and deterioration in order to maintain repeated compression and high load compression, and ambient temperature. The huge dimension can be solved by measures such as the use of a special high load elastic member or the arrangement of the elastic member in a non-rotational state, but the disturbance of the elastic pressurizing force generated from the pressurizing device itself brings forth instability of direct frictional transmission and degeneration of efficiency. Accordingly, it has been strongly expected that the pressurizing force and the revolution number are applied to the elastic pressurizing device having the elastic member and the non-elastic pressurizing device using the negative measures for applying restoring compensation of an error in pressurizing force caused by manufacturing or use of high load and already generated to a proper value, and the positive measures for applying function adjustment for further accelerating and strengthening utility of an elastic member during transmission or during stoppage.

SUMMARY OF THE INVENTION

A fundamental solution of the present invention is to provide a pulley press controlling apparatus using an elastic member in which a pressurizing device always applies an elastic pressurizing force to a pulley, and always controls it to a predetermined desired pressurizing force selected value with the compensation of an error in pressurizing force of the elastic pressurizing force and/or the adjustment of pressurizing function to stably maintain and strengthen the utility function of the elastic pressurizing force of the elastic member in a long period of time.

According to a first aspect of the present invention, an error in pressure of an elastic pressurizing force caused by the manufacturing and processing accuracy of a pressurizing device having an elastic member and the peripheral temperature of installation and caused by the deformation and deterioration of the elastic member under the repeated compression or high compression for a long period of time is restored and compensated to always apply an elastic pressurizing force of high accuracy.

According to a second aspect of the present invention, a desired selected value of an elastic pressurizing force applied by an elastic member is applied with fine adjustment during transmission operation to forcibly change the efficiency of transmission or safety rate, or applied with extremely low reduction adjustment positively during stoppage of transmission to forcibly release or suppress the compression state for a long period of time to thereby apply strengthening adjustment of utility function of the elastic member substantially.

According to a third aspect of the present invention, restoring compensation of an error in pressure of an elastic pressurizing force and adjustment for strengthening a pressurizing force by forcibly reducing the pressurizing force selected value are combined so that operating information of restoring compensation is taken in at the time of the strengthening adjusting operation in the process of applying pressure to or releasing pressure from the elastic member to effect operation processing to newly execute pressure error compensation for variable speed or press control.

According to a fourth aspect of the present invention, when a pressurizing device operates in variable speed a pulley under non-elastic pressurizing force, an error in revolution number of a secondary pulley caused by a deformation and deterioration of belt dimension is compensated by the procedure similar to that taken for the error in pressurizing force.

According to a fifth aspect of the present invention, since a pulley added an elastic force controls an output torque based on a belt frictional force and a pulley added a non-elastic force controls an output revolution number, a control device provides operating instructions to the operating devices by dealing with various informations collectively and so simplicity and reliability of control manipulation are achieved.

It is a fundamental object of the present invention to provide a pulley press controlling apparatus using an elastic member, the apparatus including:

a pressurizing device for applying an elastic or non-elastic pressurizing force to a pulley; an operating device for operating said pressurizing device; a condition detector for knowing a detected value of a pulley pressurizing force or a pulley revolution number; and a control device for outputting, as a pressure operating instruction, a desired selected value of an elastic or non-elastic pressurizing force predetermined in a storage device in response to an input operating instruction, said control device having a processing unit for applying to the input operating instruction a compensation amount and/or an adjustment amount corresponding to a process deviation of said selected value and said detected value to convert and output it to said pressure operating instruction.

Further other object of this invention is that an elastic force supplying pulley can control the torque by a belt friction force, and non-elastic force pressure supplying pulley can control the revolution number, respectively so that the respective operating instructions may be processed in the lump to supply the informations to each operating device independently, and thereby simplifying and accelerating the control operation.

According to the first means for solving a problem in the present invention, said control device causes said processing unit to increase and decrease the compensation amount corresponding to said deviation amount from the input operating instruction in order to make said deviation substantially zero to convert it into the pressure operating instruction, whereby a pressure error of said elastic pressurizing force in said pressurizing device is restored and compensated.

According to the second means for solving a problem in the present invention, said control device causes said storage device to fine-adjust the desired selected value of said elastic pressurizing force during a period of transmission operation or transmission stop of said transmission device in order to forcibly enhance the efficiency or the safety rate with respect to frictional transmission, or to store in advance the adjustment amount for the reduction adjustment in order to suppress deterioration from high compression of the elastic member, and said processing unit forcibly increases an decreases said adjustment amount from the input operating instruction to convert it into the pressure operating instruction to impart a strengthening function to said pressurizing device.

According to the third means for solving a problem in the present invention, the error restoring compensation of the elastic pressurizing force and the forcible reduction adjustment of said elastic pressurizing force selected value in order to suppress deterioration of the elastic member are carried out, and the restoring compensation of the pressure error of said elastic pressurizing force is executed when said adjusting operation takes place to update the compensation amount when the transmission operation newly takes place for the high accuracy control.

According to the fourth means for solving a problem in the present invention, the compensation amount according to the deviation between a detected value of the revolution number of the secondary pulley or the speed ration of the transmission and a predetermined selected value of the output revolution number detector of said pulley or the speed ratio detector is applied to the pressure operating instruction.

The fifth means for solving a problem in this invention is to arrange the first and second drive sources independently connected to the first and second pressurizing devices, and thereby the operating instructions signal-processed on the side of the control device are supplied directly or indirectly.

The present invention is not limited merely to the wet type transmission device of a constant horse power transmission type having a large capacity for use with vehicles, but the present idea can be also applied to general industrial machineries having a small capacity as well as the dry type variable speed transmission irrespective of capacity. Particularly, the present invention makes of merits and demerits of the elastic device and the belt when the high pressurizing force generated by compressing the elastic device in series is applied to the pulley and the belt, and so, the present idea may be applied to the constitution that one of the pulleys holds the belt between two disks, and the other pulley is of not only the similar variable speed sheave but also the constant speed ratio sheaves of other types, and to a mere constant speed ratio transmission device. Further, not only in the case where the elastic force and the non-elastic force are applied to the secondary pulley and the primary pulley, respectively, but also in the case where conversely, the non-elastic force and the elastic force are applied to the secondary pulley and the primary pulley, respectively, the constant horse power transmission and the constant torque transmission can be achieved easily in a single machine. Also in this case, the frictional torque and revolution number of the secondary pulley can be maintained with high accuracy for a long period of time by the compensation measures and adjustment measures similar to the present example. Now, a tension type belt may be used instead of the compression type of the present embodyment.

The program control termed in the present invention includes a conception of a recent programmable control (PLC), in which adjustment and control are sequentially done in accordance with the change in a pressurizing force selected value programmed in advance in a storage device according to the change in the input manipulated variable.

The generated error of the pressurizing force results from various causes such as the deformation and deterioration of the elastic member or the belt, the error when materials or the like are manufactured, and peripheral temperature for use. To collectively restore them by one compensation, it is necessary to widely design the sliding displacement amount of the compression device in advance since the pressurizing device changes in zero and span positions. The elastic device may be added only one of the safety rate and the efficiency during the transmission operation as the strengthening adjustment, and may be applied with the additional function for applying the pressurizing force in excess of the maximum pressure P max or not more than the minimum pressure P min in the secondary pulley single shaft torque control mode. The pressure detector may convert the pressurizing force into other state amounts such as a position change other than the fluid pressure.

The single pressurizing with respect to the secondary pulley through the elastic device itself is possible during transmission operation or stoppage of the transmission unlike the primary pulley, and can be applied irrespective of the primary pulley and independently. In the constant horse power speed change gear, the pressurizing force can be reduced in the high speed rotational region. Therefore, where the elastic device or the belt can substantially suppress the settling deterioration or the deformation and deterioration even in the reduction state, it can be utilized as the substantial compression releasing measures of the elastic member according to the operating instruction.

Since the elastic pressurizing force of the pressurizing device may be applied between the pulley and the main body, arrangement order and locations of the elastic device and the compression device therebetween can be suitably changed according to the design, and where they are placed in the non-rotational state in terms of operation, rotation separating bearings may be disposed between the pulley, the compression device, the elastic device, and the main body. In the elastic device and the compression device are present a slider, a sliding unit, and a pressure transmission device as similar members, which may be jointly used with other members or subdivided and may be replaced by members such as disks of the pulley, and the main body according to the design. However, suitable changes are included in the scope of the present invention as long as they remains in mere selection and design of members.

The elastic device may be of a single elastic member, a kind of which is not limited to a wavy plate-like spring such as a dish spring but other forms such as a coil spring may be employed. Further, compression forms of the elastic deice are not limited to the continuous linear pressurizing characteristic by way of the simultaneous drive of a plurality of springs juxtaposed concentrically, but the pressurizing characteristic may be of the non-continuous stepwise characteristic by individually urging the respective elastic members with respect to the compression displacement, or of the non-linear continuous curve characteristic. Correction adjustment and compelled adjustment of an error in manufacture and an error in deterioration of the elastic member are simple measures in the case where the pressurizing characteristic is the linear characteristic.

The compression device may be a normal trapezoidal screw, and is not limited to a winding sliding mechanism comprising a displacement mechanism for converting rotation to sliding like a rotational cam, but a fluid pressurizing and sliding mechanism like a hydraulic cylinder may be employed. As long as the device is a jack mechanism having a pressurizing ability, a driving source may be an electric type or a fluid pressure type, and the installation place may be also a non-coaxial position or, rotational or non-rotational is available. As the first compression device, an example is disclosed in which a speed change displacement amount $L_{01}$ of a secondary pulley and a compression displacement amount $L_{02}$ of an elastic device are moved by the total displacement amount $L_0$ (=$L_{01}$+$L_{02}$) with a single ball screw, but the compression device and its urging control device may be provided individually as long as they operate synchronously each other. When the compression amount of the elastic device need be further reduced, a compression displacement amount $L_{03}$ of the elastic member itself may be provided separately.

The displacement amount $L_0$ on the secondary pulley side required is about two times or so of the displacement amount $L_1$ on the primary pulley side. Since the rotational operating direction as well as the operating amount are different according to the respective cases, well-known elements such as a winding pitch, a rotational direction, a revolution number of the compression devices, or a pressurizing direction of a threaded groove (right-hand thread, left-hand thread), and a speed ratio of the gear transmission may be suitably selected according to the design. As the driving source, there is used an AC or DC servo motor provided with an error signal transmission impeding means having self-lock functions of a reversible motor, that is, an anti-rotation brake mechanism and an anti-overrun function, but when the step motor itself performs the function of the preventive means, an open-loop drive may be done. In a trapezoidal screw and so on, a frictional resistance of metals surfaces is well-known to have such a self-lock function in itself. And also mechanical motors such as fluid or hydraulic motors may be applied.

BRIEF DESCRIPTION OF THE DRAWINGS

The preferred embodiments of the present invention will be described in detail below with reference to the attached drawings, wherein;

FIGS. 9A and 9B are views showing shutdown sequence of the transmission by the control device in the above apparatus according to the first embodiment.

DETAILED DESCRIPTION OF THE PREFERRED EMBODIMENTS

First Embodiment

Figure 1:
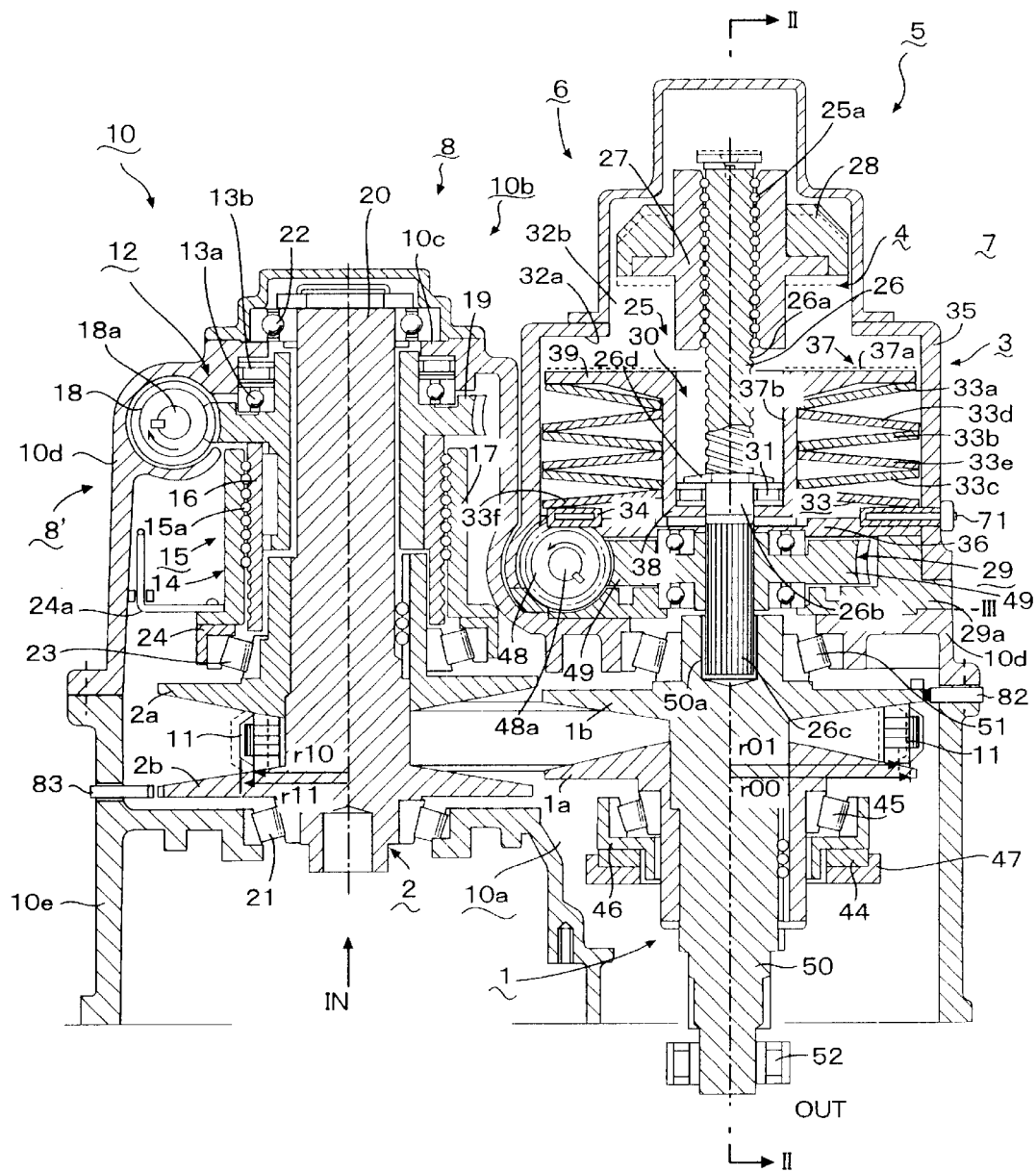
FIG. 1 is a cross-sectional view of a continuously variable speed transmission for vehicles to which an apparatus according to a first embodiment of the present invention is applied.

FIGS. 1 to 9 show constructions of parts and a pressurizing device of, as one example, a continuously variable speed transmission for vehicles to which a pulley press controlling apparatus using an elastic member according to a first embodiment of the present invention is applied. A variable speed transmission device 10 comprises, as a fundamental constitution, a variable speed transmission device 10a comprising a primary transmission wheel or a primary pulley 2, a secondary transmission wheel or a secondary pulley 1, and a belt 11 extended over and between both the pulleys; and a variable speed control device 10b comprising a secondary operating unit 6 on the side of the secondary pulley 1 for variable-speed controlling the pulleys 1, 2, a primary operating unit 8 on the side of the primary pulley 2, an operating device 9 including operating device 9a, 9b for synchronously or non-synchronously driving both the operating units 6, 8, and a electronic control device 69. The operating device 9 comprises two driving sources 60a, 60b. The primary operating unit 8 is energized by the driving source 60b and a pressurizing device 81, and the secondary operating unit 6 is energized by a pressurizing device 5 comprising an elastic device 3 and a compression device 4 for compressing the former and the driving source 60a. A pulley press controlling apparatus 7 by an elastic member according to the present embodiment is in the form of the control of the pressurizing device 5, 81 for variably press controlling two of the pulleys 1, 2 which will be described in detail below.

In any of the pulleys 1, 2, sliding disks 1a, 2a and fixed disks 1b, 2b are opposed to each other so that the former are slidably moved relative to the latter through a key, the pulleys 1 and 2 being arranged reversely to each other. The operating units 6, 8 for the pulleys 1, 2 control the balance of the pressurizing force from the relative distance between the two disks to continuously change the contact radius r with the belt 11 shown in a compression on type in both the pulleys 1, 2, achieving the power transmission with a fixed horse power in the whole variable speed region. In the belt 11, a position of the maximum speed ratio is depicted in FIG. 1, while in FIG. 2, for the sake of convenience of explaining operation, a position of 70% speed ratio where the right half is maximum diameter, and the left half is radius r70 is depicted. The transmission device 10 constitutes a wet type speed change gear which forms a closed oil storage chamber comprising a main member 10e and a lid member 10d.

A compression device 14 of the primary operating unit 8 comprises a sliding device 15 having a winding press device 15a and an urging device 12 for actuating the former. In the present embodiment, the former comprises two sliders 16, 17 formed with ball threads as the press device, while the latter comprises a worm transmission device 12 comprising a worm 18 and a wheel 19. A primary shaft 20 is supported by bearings 21, 22. A compression device 14 is arranged through bearings 13a, 13b and 23 between a body standard surface 10c and the belt 2. When the slider 16 is turned by the wheel 19, the other slider 17 is not rotated but is pressed and slidably moved only in the axial direction by a guide rod 24a. The winding thread of the compression device 14 is machined into the right-hand thread. Numeral 24 designates a pressure transmission device which constitutes a part of the slider 17. For the purpose of eliminating the instability of the contact radius between the primary pulley 2 and the belt 11, in the operating unit 8, only the pressurizing force is applied directly, and the elastic force is removed positively.

Figure 2:
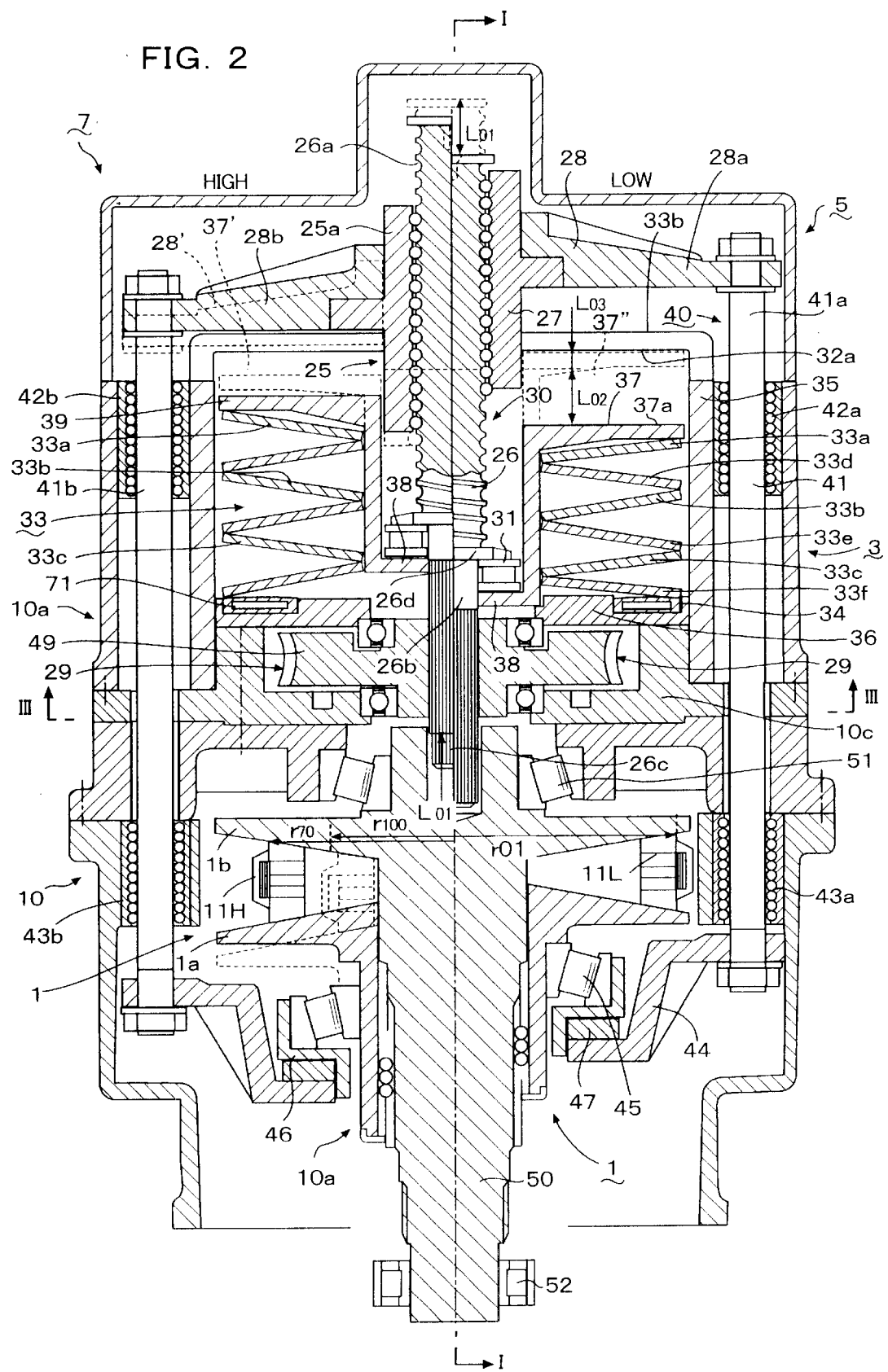
FIG. 2 is a longitudinal sectional view taken on II—II of the above continuously variable speed transmission shown in FIG. 1.
Figure 3:
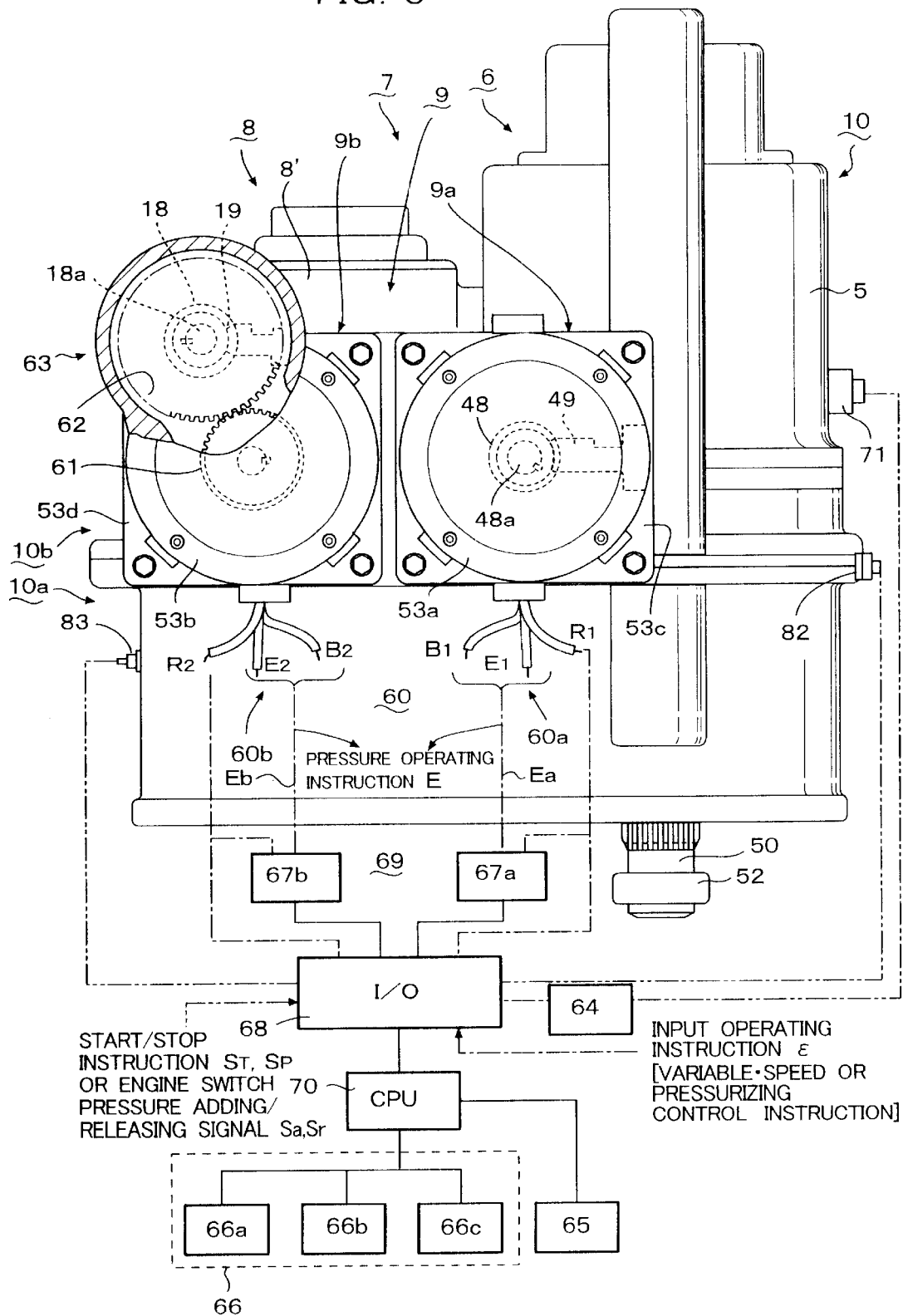
FIG. 3 is a constitutional view of an operating device of the above continuously variable speed transmission and a control device shown in FIGS. 1 and 2.

There is disclosed an example in which the pressurizing device 5 of the secondary operating unit 6 is not installed around the sliding disk 1a but is installed in a non-rotational state on the lid member 10d on the same plane as the primary operating unit 8. As shown in FIG. 2, the pressurizing device 5 comprises two transmitting lever shafts 41a, 41b from a lever 28 branched right and left about the compression device 4 disposed on the same shaft as the secondary pulley rotational shaft, four linear ball bearings 42, 43, and a shifter 44, and is connected to a pressure transmission device 40 for transmitting the pressurizing force via a gimbals 47, a thrust receiver 46, and a bearing 45 disposed on the pulley 1. The internal constitution of the pressurizing device 5 shows by way of an example in which the pressurizing forces of the elastic device 3 and the compression device 4 are joined in series with each other with the bearing 31 being a joint point. Accordingly, the elastic pressurizing force of the elastic device 3 is applied, as the composite pressurizing force, in series with the compression device 4 to the pulley 1 via the compression device 4 and the transmission device 40 from the bearing 31 with a bottom lid 36 which is a body standard surface 10c as a standard.

The elastic device 3 in the present embodiment is in the form of an example of a single construction in which two sides of a plurality of wave-plate like elastic members 33 are alternately combined in series and sandwiched by two sliders 36, 37 and accommodated in advance into a casing 35 in a fixed pressurizing state. The elastic device 3 is disposed on the fixed body in a non-rotational state and supported vibrationally at one end and non-vibrationally at the other end, the slider 37 is connected and pressed to the compression device 4, and the slider 36 constitutes a fixed bottom lid. The slider 37 compresses the plurality of elastic members 33 as it compresses and presses, and at the same time, transmits the reaction to the secondary pulley 1 from the compression device 4. The elastic member 33 comprises 6 well-known dish springs with a inclined part applied in a radial direction, surface-directed springs 33a to 33c, back-directed springs 33d to 33f being alternately opposed in series, and is pressed by a pressurizing element 37a while being guided by a cylindrical guide 37b of the slider 37. On the upper end of the box 35 is provided a semi-circular engaging member 32a formed with openings 32b divided into two sections to house the elastic member 33 with a value in which an initial pressurizing state is in advance equal to or lower than the minimum pressurizing force Ps. It is noted that the compression pressurizing force can be selected suitably according to a series or parallel combination of dish springs.

A pressure detector 71 is arranged between the elastic device 3 and the bottom lid 36 of the fixed body 10d. Since the whole compression pressurizing force of the elastic member 33 is transmitted to the secondary pulley 1 with the bottom lid being a standard, the pressure detector 71 can detect, as the detection value, the whole pressurizing force to the secondary pulley 1. On the other hand, the stopper 38 is provided at the end of the guide 37b of the slider 37, which is connected to the compression device 4 for the compress pressurizing while turning through the bearing 31 to provide transmission of pressure each other. It is noted that the pressure detector 71 may be disposed in other locations if it can detect the whole pressurizing force. The elastic device 3 in the present embodiment is connected with the compression device 4 to constitute a detachable single pressurizing device 5, but as described later, it is interposed between a main element, a sliding device 25 of the compression device 4 and an urging device 29 for driving the former, and connected each other via the elastic member 33 of the elastic device 3 and through-holes 30 of the sliders 36, 37.

The compression device 4 has a sliding device 25 comprising two sliders 26, 27 formed with a ball screw as a press device 25a, and an urging device 29 comprising a worm 48 and a wheel 49 as an anti-inversion self locking mechanism to from an error signal transmission impeding means preventing from a pressure outflow, the elastic device 3 being sandwiched therebetween. The slider 26 is formed by a threaded part 26a, a connecting part 26b, a sliding part 26c, and a pressurizing part 26d. The sliding part 26c forms a spline shaft, receives only a turning force between it and the wheel 49, transmits the turning force to the threaded part 26a, and is engaged slidably in the axial direction. With this constitution, the compression device 4 is assembled integrally with the elastic device 3 secured to the main body 10, and is supported in a levitating or floating state with respect to the secondary pulley 1 and the elastic device 3 to assure the transmission of vibrations therebetween. In the present embodiment, the tubular ball threads applied to the slider 16 of the sliding device 15 of the primary operating unit 8 are processed to have the right hand threads while the rod-like ball threads of the slider 26 of the secondary operating unit 3 are processed to have the left hand threads. As shown in FIG. 2, the slider 27 is applied with a connecting lever 18 having two levers 28a, 28b, and connected to a transmission lever 41 of a pressure transmission device 40. The sliding device 25 is supported in a floating state by three points, i.e., a bearing 31 at the extreme end, and two levers 41, and the sliding part 26c has a fixed length for both variable speed displacement and vibration displacement.

The sliding device 25 is disposed coaxial with the rotational center of the secondary pulley 1, and is dispersively connected by two levers 41a, 41b disposed in parallel right and left from the center shaft, and therefore, the pressure transmission device 40 of a bifurcated branch point construction assures the stability of pressure transmission even with respect to great elastic pressurizing force between the sliding device 25 and the secondary pulley 1. Since at this time, the elastic device 3 is disposed on the fixed body to enable vibration transmission between the sliding device 25 and the secondary pulley 1, both the sliding device 25 and the pressure transmission device 40 are supported in a floating state. However, where the elastic device 3 is connected directly to the secondary pulley 1, even if the elastic device 3 itself is supported in a floating state, it directly transfers the vibration force, and therefore, the floating characteristic and the vibration transmission are not necessary for the compression device 4. Also when only one of the elastic device 3 and the compression device 4 is apart at a non-coaxial position while the other is connected to the secondary pulley 1, the pressure transmission device 40 is necessary, but the consideration of the aforementioned floating characteristic and vibration transmission characteristic is the same. In this case, the lever 28 may invert the transmission direction of pressure by the principle of lever.

The operating device 9 has, in the present embodiment, driving sources 60a, 60b individually to variably drive the secondary pulley 1 and the primary pulley 2 and the respective transmission wheels, is constituted by reversible motors 53a, 53b with gear heads of the same specification, gear heads 53c, 53d, and a gear transmission 63, and is connected to the compression devices 4, 14 of the respective transmission wheels. Both the reversible motors 53 is a well-known DC servo motor having a brake and an encoder, to act as an error signal transmitting impeding means preventing from a pressure inflow. It is noted that for the driving source providing the movement displacement of two sliding disks, a single motor may be used in common. When in the variable speed operation, the movement displacement amount $L_0$ of the compression device 4 of the secondary pulley 1 is synchronized with the displacement of the movement displacement amount $L_1$ of the primary pulley 2 so that the variable speed displacement amount $L_{01}$ of the secondary pulley 1 and the compression displacement amount $L_{02}$ of the elastic member 33 are synchronized with each other to provide the sum amount $L_0$ (=L $L_{01}+L_{02}$)' Accordingly, the transmission 63 for gears 61, 62 reduces the displacement amount $L_1$ from $L_0$ between the pressurizing devices to synchronize the both.

A control device 69 comprises storage devices 65, 66, a processing unit 70, an input/output unit 68 including a converter such as A/D and D/A converters, a conversion amplifier 67, and a filter 64. The constitutions of various devices except a pressure detector 71 described later are well-known, which is disclosed, for example, in "1998 to 99 SERVO SYSTEM GENERAL CATALOGUE" published by SANYO DENKI CO., LTD, and is commercially available, and therefore only the main mode operation will be explained. To the amplifier 67 are electrically connected encoder signals $R_1$, $R_2$ for the feedback control of brake instructions $B_1$, $B_2$ and the manipulated variable except operating instructions $E_1$, $E_2$ such as a variable speed instruction between the reversible motors 53.

To the input/output unit 68 are electrically input a start/stop and a speed ratio input signal, a peripheral temperature detection signal and a pressure detection signal of the transmission device 10, and rotation signals of revolution number detectors 82, 83 of the secondary pulley 1 and the primary pulley 2. The storage device 66 including EPROM, RAM and so on is connected to the processing unit 70. The storage device 66 has three kinds of information. To the device 66a are input pieces of information of the maximum pressurizing force P max and the minimum pressurizing force P min to the secondary pulley predetermined according to the fixed frictional force between the secondary pulley 1 and the belt 11, the fundamental actual pressurizing characteristic and the linear equation A between the input manipulated variable E and the elastic pressurizing force value P of the pressurizing device 5; to the device 66b are input information of the conversion characteristic B for the various conversions and processes of the input manipulated variable E and the pressurizing manipulated variable E to the pressurizing device 5; and to the device 66c are input sequence processing information of the characteristic C such as pressurizing force values $P_0$, $P'_0$ when the compression amount to the elastic member 33 during the operation of and during the stoppage of the transmission device 10 is reduced and adjusted. Stored in the storage device 65 are other pieces of information when the processing unit 70 executes a programmable control. The filter 64 removes a ripple part caused by the elastic vibration of the elastic pressurizing force obtained by the pressure detector.

Figure 4:
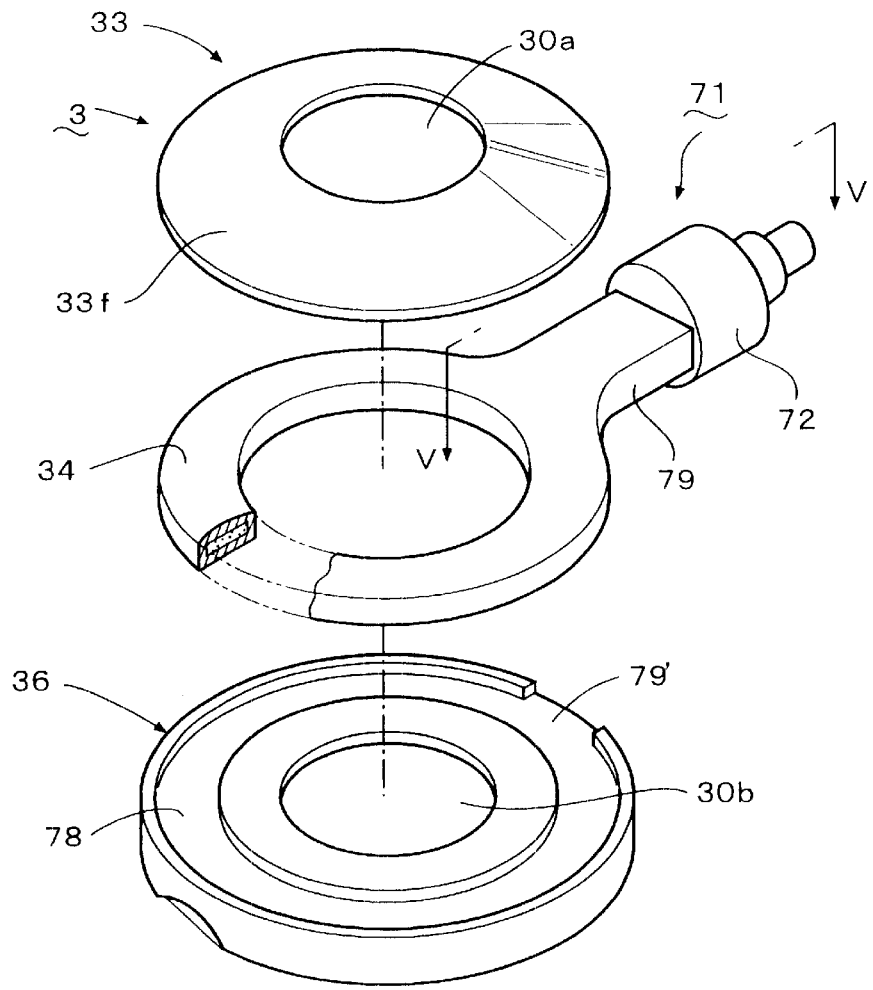
FIG. 4 is an exploded perspective view showing an arrangement of a pressure detector for an elastic pressurizing force of the above apparatus according to the first embodiment.
Figure 5:
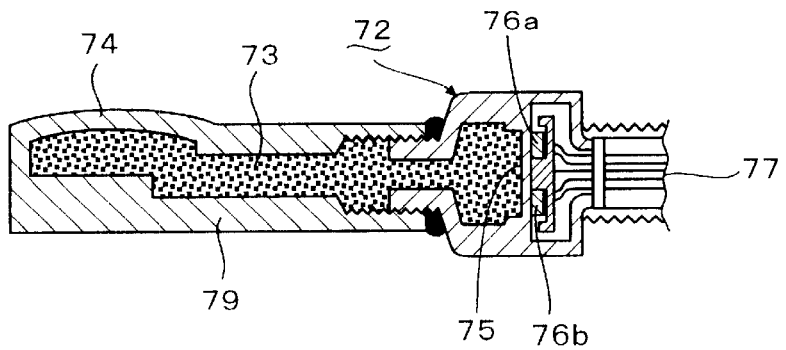
FIG. 5 is a partial sectional view taken on line V—V of the above pressure detector shown in FIG. 4.

FIG. 4 is an exploded perspective view showing the construction of the pressure detector 71 in the present embodiment. The pressure detector 71 comprises a pressure receiving unit 34 interposed between the bottom lid 36 of the casing 35 and the elastic member 33f to convert the pressurizing force into a detectable separate state amount, and a strain gauge unit 72 located externally of the chamber of the pressurizing device 5. In the pressure detector 71, the elastic pressurizing force is converted into the fluid pressure of a flow medium 73 by the annular pressure receiver 34. A diaphragm responsive member 74 is annularly disposed on the pressure receiving surface in contact with a plate spring 33f so as to follow the change in internal pressure easily. The strain gauge unit 72 is provided with semiconductor gauges 76a, 76b on a diaphragm 75 which deforms in response to the change in pressure to convert it into an electric amount, which is then output to a terminal 77. The pressure receiving unit 34 is accommodated in a recess 78, and the gauge unit 72 is disposed externally of the casing 35 via a connecting part.

Figure 6:
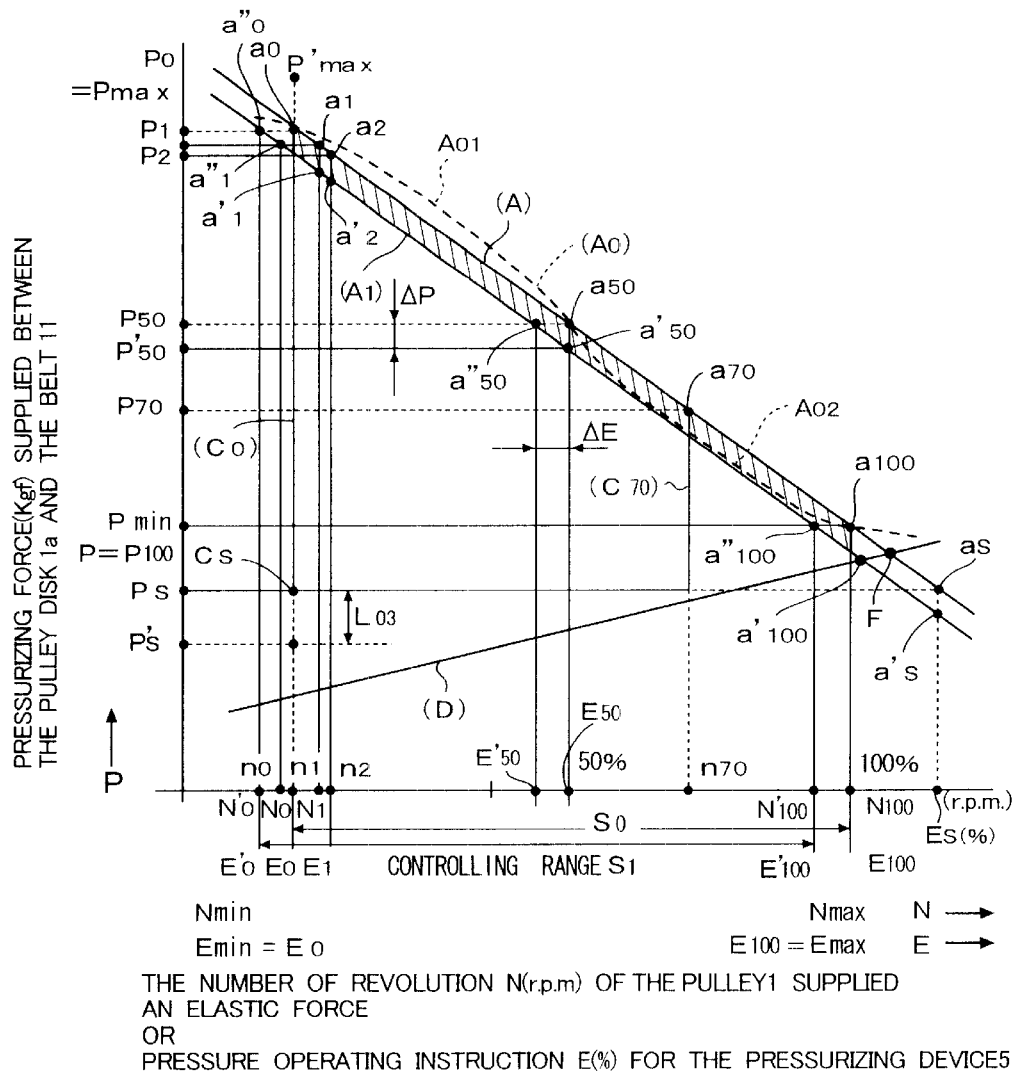
FIG. 6 is a characteristic view of the revolution number of the secondary pulley to the elastic pressurizing force of the secondary pulley by a pressurizing device in the above apparatus according to the first embodiment.

Next, the operation of the pulley press controlling apparatus 7 will be mentioned mainly taking up the pressurizing device 5 with reference to FIG. 6. It is supposed that as shown in FIG. 1, in the state that the belt 11 is positioned in the maximum speed ratio, the variable speed transmission device 10 drives the input/output shafts 20, 50 which rotate at a constant speed. When the reversible motors 53a, 53b start to drive in the direction of reducing, the speed ratio, that is, while receiving a speed increasing instruction from the control device 69 and converting the electric amount into its mechanical amount, the speed change power causes the shaft 18a and the shaft 48a to rotate in the-direction opposites to each other as indicated by the arrow in FIG. 1. Since in the present embodiment, the screw means 15a and the screw means 25a are machined reversely to each other, when the sliding device 15 presses the disk 2a, the radius of the belt 11 starts to increase from $r_{10}$ to $r_{11}$. At the same time, the pressurizing device 5 having pressed at the maximum pressurizing force P max operates in the direction of reducing the pressurizing force of the sliding device 25 of the compression device 4. The sliding member 26 of the sliding device 25 moves up, the sliding member 27 reversely moves down by the amount in which winding is released, and the whole pressure pressurizing force to the elastic device 3 also is reduced to the position indicated by the dotted line. The falling amount of the sliding member 27 causes the pressurizing force to the pulley 1 to reduce via the lever 28 and the pressure transmission device 40 shown in FIG. 2 and at the same time, the belt 11 is pulled by the primary pulley 2, as a consequence of which the radius of the belt 11 reduces from $r_{00}$ to $r_{01}$.

This means that in the characteristic view A of FIG. 6, with the shifting of the output revolution number of the minimum manipulated variable E min from $n_0$ to $n_1$, the characteristic point shifts from $a_0$ to $a_1$, and the pressurizing force $P_0$ to the pulley 1 is also reduced to $P_1$. Simultaneously, this indicates that the pressurizing force and the revolution number in the pulley 1 are in a relation of inverse proportion to each other. Similarly, when a speed increasing instruction is given from the reversible motors 53a, 53b, the similar operation is repeated. The revolution number $n_1$ is shifted to $n_2$, the pressurizing point $a_1$ is shifted to $a_2$, and the pressurizing force $P_1$ lowers to $P_2$. If the revolution number should be $n_{70}$ of 70%, as shown in the left half of FIG. 2 the compression amount of the elastic member 33 linearly reduces at a negative inclination along the characteristic line A of FIG. 6 and $P_{70}$ is assumed at point $a_{70}$, and the pressurizing force is also transmitted from the compression device 4 and the pressure transmission device 40 to the secondary pulley 1. Similarly, with the rotation of the sliding member 26 of the sliding device 25, the pressurizing characteristic linearly decreases as the manipulated variable increases, and at the maximum speed rotation of the shaft 50, the minimum pressurizing force P min is assumed. Reversibly, in order to assume the reduction state again, the reversible motors 53a, 53b are reversibly driven to return to the original position in accordance with the above-described reverse operation.

Next, an automatic aligning function for an elastic pressurizing force of an elastic member in the present invention will be described. The variable speed gear has an error factor produced within the inside and a variation factor entered from the outside, both of which comprise an obstacle against the normal transmission. Typically, the former includes a longitudinal elongation and a widthwise wear of the belt 11, and the latter includes a supply of a variable speed instruction and a shock load from input/output side apparatuses. According to the present invention, the elastic device 3 absorbs the main cause for adverse influence automatically to decide a belt diameter in itself and to self-settle it, momentarily returns the operation to the normal transmission operation automatically again to let the belt 11 have the automatic aligning function for applying a fixed tension, and always maintains the tension and the contact radius of the belt 11 in the stable state.

It is now assumed that the elongation of the circumferential length of the belt 11 itself gradually progresses during the operation at the maximum speed ratio. Since at that time, the primary and secondary operating units 8, 3 are not urged, the contact radius of the primary pulley 2 remains unchanged. However, in the secondary pulley 1, the radius is enlarged according to the state of the elongation. The revolution number decreases by that amount, and disk 1a as well as the elastic device 3 slightly move. However, only the slight change occurs in the pulley holding pressure P, and the holding pressure with respect to the belt 11 keeps maintaining the state of substantially the maximum load. This means that even if the revolution number changes slightly, the transmission function itself receives no obstacle but the automatic aligning is effected so that the tension and the contact radius of the belt are stabilized to hold the normal transmission. Further, consideration is taken that the belt 11 is reduced in thickness due to its widthwise wear. Also in this case, the contact radius of the primary pulley 1 is reduced automatically due to the pressurizing of the elastic device 3 in the secondary pulley 1 during the stoppage of the operating units 6, 8, and at the same time, since the radius likewise enlarges in the secondary pulley, the output revolution number decreases, but is automatically aligned while maintaining the normal transmission function.

Further, consideration is taken into an example in which sudden shock vibrations enter the input/output shafts 20, 50. Also in this case, the automatic aligning function works. On the side of the secondary pulley 1, the disordered vibration by which the radius $r_0$ of the belt 11 is enlarged or reduced occurs for a moment, but this vibration is reversibly transmitted from the pressure transmission device 4 to the compression device 4. The vibration of the compression device 4 is transmitted from the sliding member 27 to the sliding member 26. Since the spline sliding shaft 26c at the extreme end of the sliding member 26 is engaged with the wheel 49 slidably in the axial direction, the whole compression device 4 is arranged in the vibrational floating state except that the former is engaged with the connecting element 38 of the sliding member 37. Accordingly, only the elastic device 3 directly elastically absorbs the entered disordered vibration to terminate the turbulence in a short period of time. The internal vibration factors for the variable speed instruction or the like are totally the same. Particularly, since the value of the elastic force changes corresponding to the change in the value of the pressurizing force, its effect is positively assured in the high speed region as well as the low speed region.

In the following, the operation of the control device 69 for programable-controlling the stabilization of the accuracy of the pressurizing force of the elastic member and the belt dimension will be described with reference to FIGS. 6 to 9.

Figure 7:
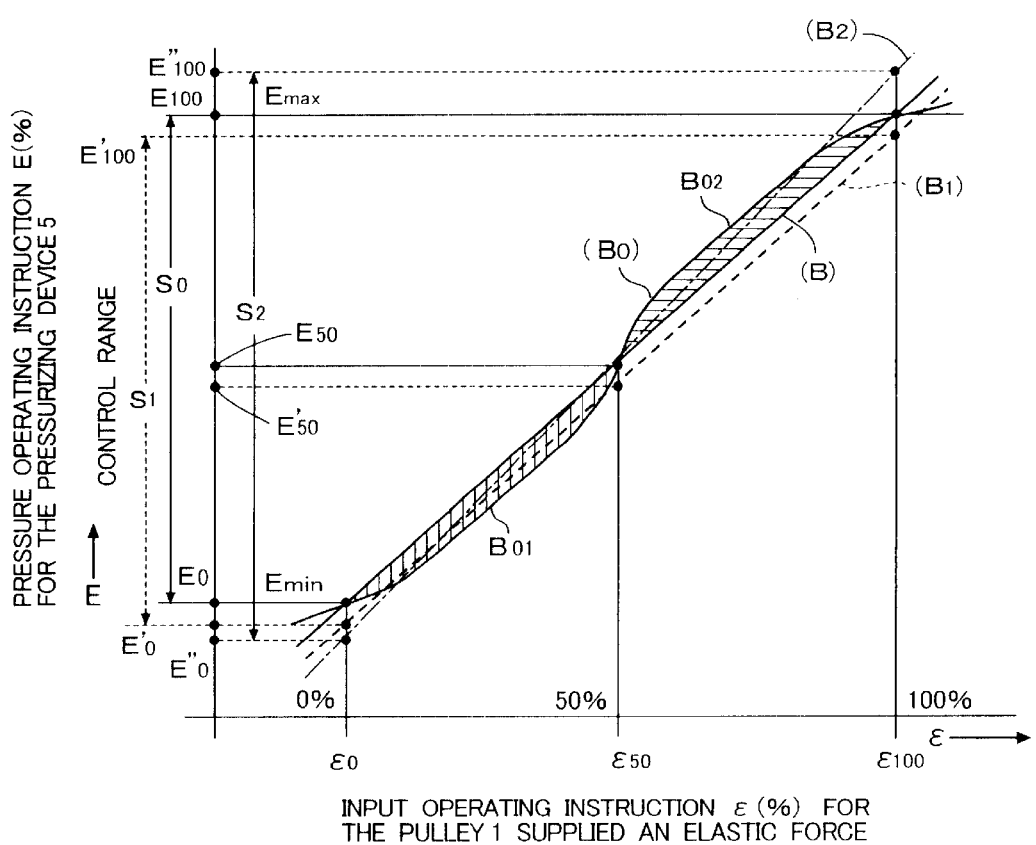
FIG. 7 is a manipulated variable conversion characteristic view of a pressure and operating instruction to an input operating instruction of the control device in the above apparatus according to the first embodiment.

There are two cases, one where a single variable speed instruction is branched and synchronously supplied to both the pressurizing devices 5 and 8', and the other where a variable speed instruction is fixed in the primary pulley 2, and only the secondary pulley 1 is pressed and controlled in a constant speed state. Therefore, the instruction to the secondary pulley 1 will be described here merely as an operating instruction. In conversion where the ratio between input and output signals of the conversion characteristic B of FIG. 7 is 1:1, an input operating instruction as a variable speed instruction is a pressure operating instruction of the pressurizing device 5 directly without modification, showing a normal control form free from the presence of compensation or adjustment of the pressurizing force as non-regulating amount. That is, on the side of the pressurizing device 5, the maximum pressure P max and the minimum pressure P min are made to correspond in advance to the minimum manipulated variable $E_0$=E min and the maximum manipulated variable $E_{100}$=E max, respectively. This is the case where on the side of the control device 69, input $\epsilon_0$ and input $\epsilon_{100}$ of the manipulated variable are made to correspond to output $E_0$ and output $E_{100}$, respectively, to apply input $\epsilon$=E to the pressurizing device. The storage device 66a stores therein the desired pressurizing characteristic A in the form of a linear equation P=$-\alpha$E+$\beta$ of the elastic member 33, and the storage device 66b stores therein, as the pressurizing force selected value, the conversion characteristic B in the form of an imaginary linear equation E=$-\alpha_0 \times \epsilon + \beta_0$ for adjusting the pressurizing manipulated variable E. In the present invention, on the side of the conversion characteristic B, compensation or adjustment is applied to the selected value, and as a result, the pressurizing force or revolution number selected value applied to the secondary pulley by the elastic member and the belt is always conversion-controlled as regulated signals to stabilize the accuracy and the functional effect of the elastic pressurizing force and the revolution number for a long period of time.

(1) Compensation for Deterioration in Deformation of the Elastic Member

When the initial pressurizing characteristic A in FIG. 6 is reduced to the deterioration characteristic A1 due to the deterioration of the elastic member 33, the stable frictional transmission requires the compensation for substantially restoring to the original pressurizing state. Since the secondary pulley 1 requires the pressurizing change regions P min to P max determined in the storage device 66a irrespective of presence of deterioration in the elastic member, the manipulated variable $E'_{100}$ and $E'_0$ when the pressures P min and P max in the characteristic $A_1$ are detected by the pressure detector 71 can be read from an encoder signal $R_1$ of the motor 53a or an instruction $E_1$ from the controller 69. This means that the conversion characteristic $B_1$ in a new virtual linear equation indicated by the dotted line is updated, as E=$\alpha'_0 \times \epsilon + \beta'_0$ to and taken into the storage device 66b by input information $E_0$ and $E'_0$, and $E_{100}$ and $E'_{100}$ in each stage when the detected value arrives at $P_0$ and $P_{100}$, so that factor $\alpha_0$, $\beta_0$ and decided from two linear equations.

That is, even if the deterioration occurs in the elastic member 33 so that if the input operating instruction $\epsilon$ arbitrarily changes between prior regions $\epsilon_0$ to $\epsilon_{100}$, the elastic pressurizing to the secondary pulley 1 is updated by the compensation processing from the conversion characteristic B to the characteristic $B_1$, and the control region between the control device 69 and the pressurizing device 5 merely changes from $S_0$ to $S_1$, and the secondary pulley is maintained stably in the fixed pressurizing force as usual. Once the conversion characteristic $B_1$ after compensated is taken into the storage device 66b, the input operating instruction $\epsilon$ is converted into the output operating instruction E in the characteristic $B_1$ and output. For example, in FIG. 7, when an input instruction $\epsilon$ 50 of 50% is present, the output manipulated variable changes from $E_{50}$ to $E'_{50}$, and the output error amount $\Delta$P deteriorated from $a_{50}$ to $a'_{50}$ is a deviation relative to the desired pressurizing force selected value P50 determined in the storage device 66a. The compensation amount $\Delta$E from $a'_{50}$ to $a''_{50}$ in the characteristic $A_1$ is processed in reduction from the output pressure operating instruction $E_{50}$ to output a new output instruction $E'_{50}$ (=$E_{50}-\Delta$E).

Because the deterioration in deformation of the elastic member 33 results from the contraction in dimension in the compression direction, it is often that before and after the deterioration, the inclination $\alpha$ less changes and is substantially the same, and only the $\beta$ part often changes. So, not only two-point information but one-point information is possible to subject to substantial error compensation. For example, if the manipulated variable $E'_{100}$ of the characteristic $A_1$ at the time of passage of the minimum pressure P min is detected by an encoder signal $R_1$, the linear equation of the conversion characteristic $B_1$ after compensation from the initial value $E_{100}$ can be calculated merely by changing constant $\beta_0$ to $\beta'_0$. Accordingly, the output error can be substantially compensated by the linear equation E=$\alpha_0 \times \epsilon + \beta'_0$. Since the storage device 66a has information of the pressurizing value P with respect to the input manipulated variable $\epsilon$ other than P max and P min, this processing can be done even at characteristic points other than P min.

(2) Compensation of Error in Manufacture of the Elastic Member

Figure 8:
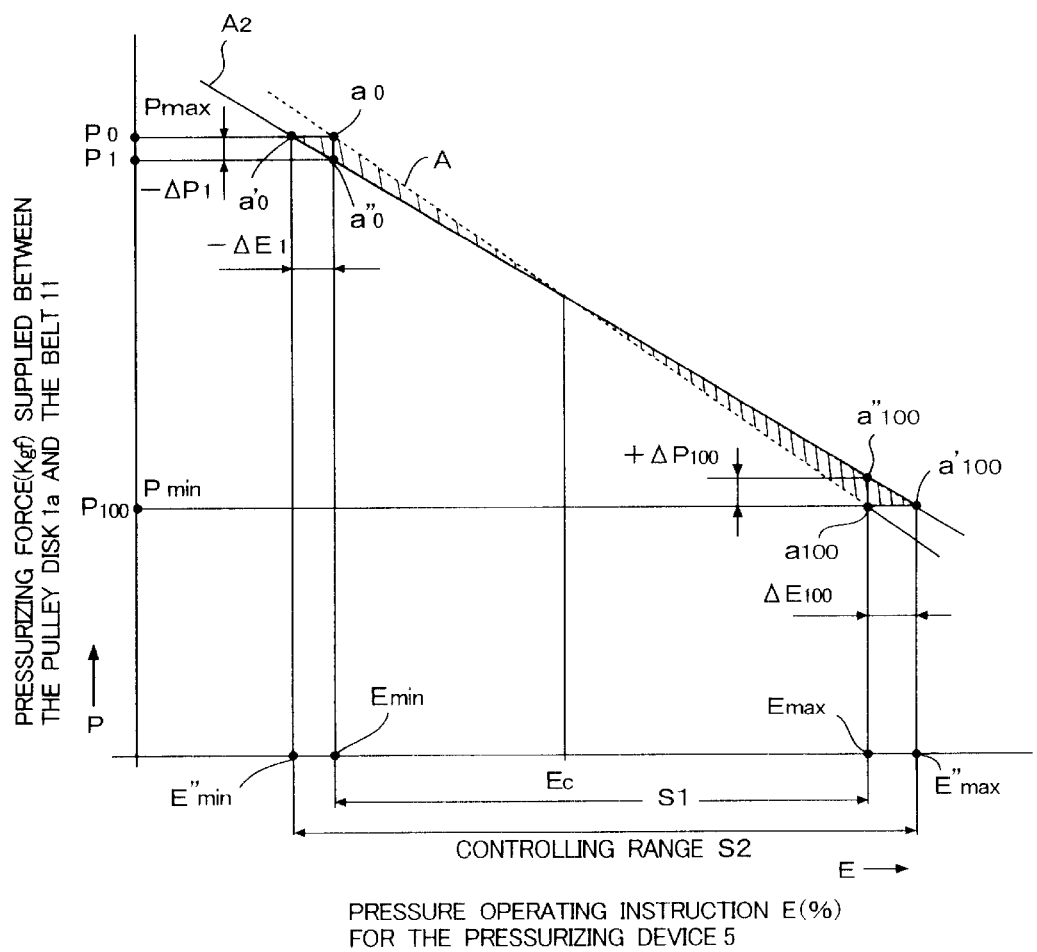
FIG. 8 is a secondary pulley pressurizing force characteristic view due to a manufacturing error of the elastic member in the above apparatus according to the first embodiment.

In FIG. 8, when the elastic member 33 is disordered into the state of the characteristic $A_2$ shown by the solid line due to the manufacturing error with respect to the normal pressurizing characteristic A shown by the dotted line, it is necessary to restore to the original pressurizing force for the stable frictional transmission. In this case, there is shown an example in which compensating calculation is carried out with the normal characteristic A determined in the storage device 66a being as a standard. Since the desired pressurizing forces $P_0$ (P max) and $P_{100}$ (P min) required for the frictional transmission have been predetermined, the calculation of the conversion equation similar to the aforementioned error in deterioration is carried out at two points, a point a, and a point $a_{100}$. Since the pressure detector 71 and the encoder signal R1 of the motor 53 indicate the secondary pulley pressurizing force P and the manipulated variable E, respectively, if at P max, $\epsilon_0$ and $E''_1$, and at P min, $\epsilon_{100}$ and $E''_{100}$ are known as detection information of the point $a_0$ and the point $a_{100}$, the conversion characteristic $B_2$ of a new linear equation E=$\alpha''_0 \times \epsilon + \beta''_0$ can be obtained as shown in FIG. 7. This is an example in which the normal secondary pressurizing force is restored with respect to any input $\epsilon$ in accordance with constants $\alpha''_0$ and $\beta''_0$, and the control region is enlarged on both upper and lower limit sides from $S_0$ to $S_1$.

Further, when the elastic member 33 and the belt 11 is used under the high temperature or low temperature condition, even expansion or-contraction of an elastic member material causes an error to occur in the elastic pressurizing force. The expansion occurs in an increasing direction reversely to the settling deterioration characteristic A1, and the contraction occurs in the same reducing direction. As will be obvious from the foregoing, in the compensation in error of the pressurizing force of the elastic member 33, after all, the temperature, the deformation deterioration such as settling deterioration, and the manufacturing error can be restored by the single error compensation. That is, when the compression amount to the pressurizing force value of the elastic member of the pressurizing device 5 is expressed by the linear equation, the maximum pressure information $\epsilon_0$ and P max, and the minimum pressure information $\epsilon_{100}$ and P min are obtained as 2-point information between the input manipulated variable $\epsilon$ and the secondary pulley pressurizing force P, and if the linear equation P=$\alpha \times \epsilon + \beta$ is stored in advance in the storage device 66a as pressurizing information necessary for the frictional transmission, the desired pressurizing force P of the secondary pulley can be calculated as the accurate pressure value with respect to the input operating instruction E for operation, which functions as a first control means. Accordingly, pressurizing of high accuracy can be maintained with respect to arbitrary manipulated variable as long as the elastic member 33 is processed in advance in the vicinity of the optimum pressurizing characteristic required for the frictional transmission.

(3) Function Strengthening Adjustment of the Elastic Member

The strengthening adjustment characteristic $B_0$ shown in FIG. 7 is a composite curve characteristic of the characteristic $B_{01}$ for strengthening the safety rate of transmission in the low speed region, and the characteristic $B_{02}$ for enhancing the transmission efficiency in the high speed region, and is input in advance in the storage device 66b. In the characteristic $B_{01}$, the pressure operating instruction E is supplied, as an instruction reduced in advance, to the pressurizing device 5 with the operating instruction $\epsilon$, and the actual pressurizing force to the secondary pulley 1 indicated by the dotted line $A_{01}$ in FIG. 6 is compelled, and the frictional transmission is further stabilized. Conversely, in the characteristic $B_{02}$, the pressurizing manipulated variable E with respect to the input manipulated variable $\epsilon$ is increased, and the secondary pulley pressurizing force is reduced. Where sudden start and sudden stop often occur in the low speed region, the reliability of the frictional transmission is strengthened, and where in the high speed region, the stable transmission continues for a long period of time, this is particularly effective for a pulley pressurizing mechanism for vehicles attaching importance to the transmission efficiency. The safety rate and the efficiency may be selected reversely to that mentioned above, and a plurality of characteristics may be stored and arbitrarily selected. Further, only one of them may be adjusted, and the rotation control region is also optional. Furthermore, function strengthening adjustment may be added due to the main factor other than the above rate and efficiency. For example, the variation of the elastic force during operation resulting from a rise in peripheral temperature of the elastic member may be automatically adjusted in pressure.

(4) Deterioration Suppression Adjustment of the Elastic Member

FIG. 9 is a sequence view of a secondary control means for suppressing and substantially releasing the continuation of the high pressurizing and compression state of the elastic member 33 in a period of stoppage of the transmission device 10; FIG. 9A shows a release sequence when the transmission device is in transmission operation; and FIG. 9B shows a release sequence when the transmission device is in stoppage. In the storage device 66c, pressurizing control is accomplished by regulating signal Sa, Sr in a fixed time of a pressure applying mode $T_{11}$ and a pressure removing mode $T_{12}$ at the time of speed change of the secondary pulley 1 or before and after the pressurizing control region $T_1$.

In FIG. 9A, in the control device 69, when a start instruction for the transmission device 10 is issued, the pressure applying mode works during the time period $T_{11}$ during transmission, and after only the elastic member is applied with pressure, the transmission device 10 enters the speed change or the pressurizing control region $T_1$. When a stop instruction is issued, only the elastic member is removed in pressure in the pressure removing mode during the off delay time $T_{12}$ with the radius of any of speed ratio positions $b'_{50}$ and $b'_0$, after which the transmission device 10 stops. Accordingly, the storage device 66c stores the speed ratio when a stop instruction is issued by an encoder signal $R_1$ of the reversible motor 53a, and when the pressure applying mode $T_{11}$ is restored, the pressurizing force with the radius of the belt at the above speed ratio is supplied and restpred. The present example is effective when the start or stop instruction can impede the transmission by a clutch or the like between the secondary pulley and the load. If the deterioration suppression of the elastic member 33 is possible at the minimum pressure $P_{100}$ or more, it is not necessary to lower the value down to the release pressure value Ps selected specially.

FIG. 9B shows an example in which the control device 69 independently urges and controls the pressure applying and removing modes $T_{11}$ and $T_{12}$ relative to the secondary pulley 1 even during the stoppage of the transmission device. The pressure applying and removing modes can be supplied separately from the start/stop instructions of the transmission device 10. Further, in the present example, there is employed a compelled pressurizing mode $T_3$ in which when the stop instruction is supplied, the contact radius of the belt 11 at arbitrary positions $b_{100}$ and $b_{50}$ is returned to the minimum speed state N min, i.e., the maximum pressure P max of $b_0$ by applying an operating instruction of compelled reduction during the transmission operation. Therefore, the whole pressurizing state such as variation and deterioration of the pressurizing force can be controlled and monitored by the control operation of the pressure applying mode prior to next re-start, and in addition, slow start control for starting the transmission device 10 from the minimum speed can be applied. The control mode of FIG. 9A and that of FIG. 9B are suitable for general industrial machineries and vehicles or the like, respectively, and at this time, drives in both the modes may be associated with an engine key, an idling stop signal or the like.

An example has been illustrated in which the control device 69 executes, using a programmable controller, the error compensation and the function adjustment in the above (1) and (2), and (3) and (4), respectively, but when both of them are compounded, more excellent function can be performed. Because, at the same time when the function adjustment of the above (4) is performed, the operation of the error compensation of the above (1) and (2) can be achieved. That is, if the encoder manipulated variables $E_0$, $E_{100}$ and the input manipulated variables $\epsilon_0$, $\epsilon_{100}$ at the pressure detection values $P_0$, $P_{100}$ of two points, for example, a point $b_0$ and a point $b_{100}$ are detected during operation of one of the pressure applying or removing modes, the constants $\alpha$, $\beta$ of the above linear equation after deterioration of the elastic member 33 can be calculated. The detection locations may be $b_0$, $b_{60}$ or the like. Now for the attainment of the above (3) and (4), a condition detector is unnecessary.

In the above-described mode in which the operations are compounded, the conversion characteristic in FIG. 7 is momentarily updated from one-point or two-point information in the pressure applying mode, for example, in accordance with the sequence in FIG. 9 before the start of the transmission device, and all the control regions $T_1$, $T_2$ following every start of the transmission device rely on the updated conversion characteristic. The updating need not necessarily be done every time of the start or stop of the transmission device, but may be done periodically after some start or stop. In any state of the contact radius between the belt and the secondary pulley, the accuracy of the pressurizing force applied to the secondary pulley by the pressurizing device 5 effectively exerts on the adequate frictional transmission in the control region as it is. When the transmission device 10 in FIG. 1 is operated at the constant speed ratio, and only the secondary pulley 1 is controlled in pressure, the pressurizing force is varied, actually, in accordance with the characteristics A, and $A_1$ according to the manipulated variable E in FIG. 6, but in construction of the figure, the pressurizing force is lowered in accordance with the characteristics $C_0$, $C_{70}$ with the revolution number of the secondary pulley unchanged such as $n_0$, $n_{70}$, thus being depicted conveniently.

Next, a description will be made of the measure of the compensation adjustment relative to the variation of the secondary revolution number caused by the circumferential elongation or the change in dimension of the thickness wear or the deterioration of the belt 11. In FIG. 1, using a state detector in which the non-elastic pressurizing force applied from a second compression device 14 of a pressurizing device 8' to the primary pulley 2 and the speed ratio are determined by locating control of a metal belt, the secondary revolution number and the speed ratio can be detected by a revolution number detector 82, and detectors 82, 83, respectively. If the secondary revolution number or the selected value of the speed ratio are stored in a storage device 66a in advance, the revolution number with high accuracy for a long period of time can be assured by the technical idea substantially equal to the measure of the compensation adjustment of the pressurizing force of the elastic member 33.

Second Embodiment

Figure 10A:
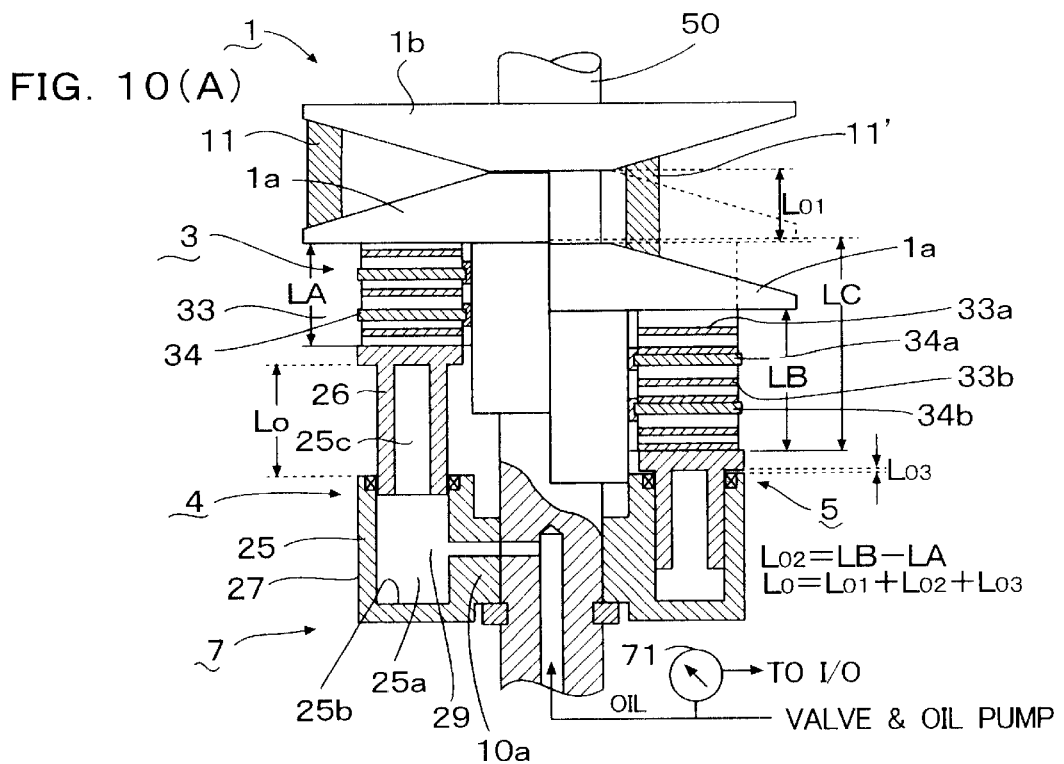
FIGS. 10A and 10B are constitutional views of a pressurizing device and an elastic member, respectively, in a second embodiment according to the present invention.
Figure 10B:
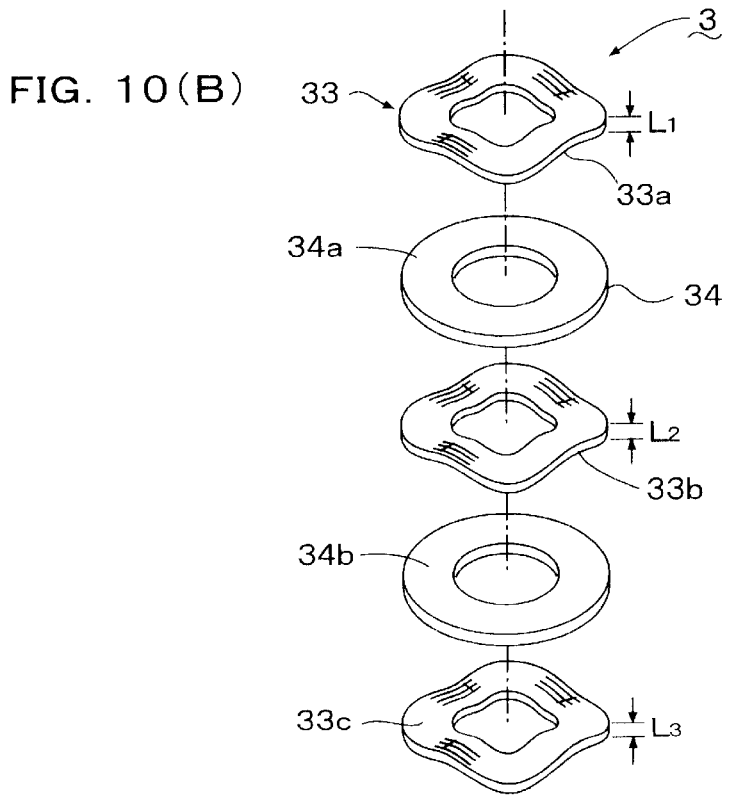

FIG. 10 shows an apparatus according to the second embodiment of this invention, wherein FIG. 10A is a sectional view of a pressurizing apparatus assembled into the pulley 1, and FIG. 10B is a perspective view of the elastic device 3 of the pressurizing device 5 disassembled. In this embodiment, the entire of the pressurizing device 5 is assembled directly and revolutionally into the disk 1a of the driven pulley 1. This apparatus is different from that of FIG. 1 since the pressurizing sequence of the elastic device 3 and the compression device 4 pressing each other in series is reversed, and in other words, the elastic device 3 directly pressurizes the driven pulley 1 with reference to the revolution main member 10a. The left half of FIG. 10A shows the maximum pressurizing and compressing condition LA (=P max) at the lowest speed, and the right half thereof shows the minimum compressing condition LB (=P min) at the highest speed. There are shown as a fluid pressure cylinder, a compression device 4 comprising a sliding device 25 composed of a plunger slider 26 and a cylinder slider 27, a pressing device 25a of a fluid medium 25c, an operating device of the conventional valve or pump etc. (not shown) connected mechanically and individually to each two pressurizing devices.

There is no difference in control operation between FIG. 1 and the present embodiment in that the elastic member 33 is compressed in high pressure in the low speed region and compressed in low pressure in the low speed region. However, in the relative distance between two disks 1a, 1b, that is, in the variable speed displacement $L_{01}$ of the secondary pulley 1, and the compression displacement $L_{02}$ in which the elastic member 33 is expanded, the displacement operating direction with respect to the increasing and decreasing direction of the pressurizing manipulated variable E of the compression device 4 is reversed. In the FIG. 1 example, the variable speed displacement $L_{01}$ of the secondary pulley is in proportion to the increase and decrease of the pressurizing manipulated variable E, but the compression displacement $L_{02}$ of the elastic member is in inverse proportion to thereto. In this example, the variable speed displacement $L_{01}$ of the secondary pulley is in inverse proportion to the pressurizing manipulated variable E, but the compression displacement $L_{02}$ of the elastic member is in proportion to thereto. Since in the present embodiment, the elastic member 33 is supported in floating, the difference $L_{02}$ (=LB−LA) between the maximum compression and the minimum compression becomes a compression displacement, and in normal variable speed control, will not be a substantial pressure removing state like a displacement amount LC (=Ps) in FIG. 10A.

General industrial machineries, vehicles or the like normally stop after being shifted to the minimum speed at the time of stop. Accordingly, the secondary pulley 1 results in maintenance of the high pressurizing state. Where they stop before a position of the belt on the pulley assumes the minimum speed, it is general that a compelled pressurizing mode $T_3$ results during the rotation shown in FIG. 9B. Therefore, if in this state, the pressure removing mode $T_{12}$ in FIGS. 9A, 9B is applied, the substantial released pressure Ps (=LC) in which the pressurizing force of the elastic member 33 is further reduced from the minimum compression value P min from the maximum pressure can be achieved. It is possible to suppress acceleration of deformation and deterioration caused by high pressure of the elastic member 33 even during a period of stop for a long period of time under the pressure removing condition. The compression device 4 may be a cylinder construction in which the well-known disk 1a serves also as the slider 26 of the sliding device 25.

FIG. 10B shows a further embodiment of the wavy plate-like elastic member, which is a special elastic member 33 having an inclined bent part which is horizontal in a radial direction and is wavy in a thickness direction, that is, in a circumferential (tangential) direction. The elastic member 33 has a partitioning plate 34 in which a wave washer having three crests and troughs is large-scaled to maintain series pressurizing instead of parallel, and three elastic members 33a to 33c, and partitioning plates 34a to 34b are incorporated therein integrally. If the elastic members 33 are made the same in thickness, the linear characteristic is obtained, and control processing is simplified.

Other Embodiments

While in the foregoing, the displacement amount $L_0$ of the compression device 4 shown has been the sum of two displacement amounts $L_{01}$ and $L_{02}$, it is to be noted that the pressure removing displacement amount $L_{03}$ for removing compression of only the elastic member 33 singly independently from the displacement $L_{01}$ between the disks between the sliders 26 and 27, right halves in FIG. 10A may be selected further greatly in advance, and pressure may be released to the pressurizing force $P'_0$ lower than the released pressure $P_0$ shown in FIG. 6 to provide the controllable whole displacement amount $L_0$ ($L=L_{01}+L_{02}+L_{03}$). As described above, the scope that can be readily created by those skilled in the art from claims in the present specification falls under the right of the present invention.

Parts in which the elastic force of the elastic member plays on the frictional transmission surface include (1) the self settling function of the pressurizing force on the contact surface; (2) the automatic aligning function between the pulley and the belt transmission; and (3) in case of the variable speed transmission device, the security of high speed responsiveness assured by the stable automatic restoring action thereby. The apparatus according to the present invention has the effect that one or both of the restoring compensation of an error in pressurizing force generated in the elastic member and the strengthening adjustment for maintaining the added function of the desired pressurizing force are subjected to programmable control according to the operating instruction to always achieve the above three functions in the whole control region over a long period of time. Further, variation of the revolution number or speed ratio caused by the elongation of the circumferential length of the belt and the deformation and deterioration of the thickness can be also maintained stably over a long period of time by the pressurizing compensation or the pressurizing adjustment of the non-elastic pressurizing force to the pulley.

When synchronous instructions supplied to a pulley added an elastic force and a pulley added a non-elastic force is mutually in an inverse proportional relation between a friction force and a revolution number, a constant power transmission is executed, and also the same machine is possible to execute a constant torque transmission when both the instructions in a direct proportional relation are supplied.

Further as non-synchronous instructions, when a single instruction is applied only to a pulley added an elastic force, a variable torque operating mode responsive to a revolution number of a variable speed input can be achieved in a constant speed-ratio state, and oppositely when supplied only to a pulley added a non-elastic force, a constant torque of a variable speed transmission is fulfilled.

The present invention has the advantage so that a variety of control systems for a variable speed transmission can be selected at a operator's disposal only by manipulating collectively in the side of the control device.

What is claimed is:

1. A pulley press controlling apparatus using an elastic member for a transmission comprising:

a belt wound to pulleys provided between a driving shaft and a driven shaft;

a variable diameter pulley provided on one or both of said shafts to slidably hold said belt between two disks;

a pressurizing device for applying an elastic pressurizing force to one of said variable diameter pulleys with an elastic member interposed in series and a non-elastic pressurizing force with an elastic member not interposed to another one of said variable diameter pulleys, and, in the alternative, for singly applying said elastic pressurizing force only to said one of said variable diameter pulleys;

an operating device having a first and a second driving source for providing respectively said elastic pressurizing force and said non-elastic pressurizing force, or having only said first driving source;

and a control device for dividing an input operating instruction into a pressure operating instruction of a torque control for said first driving source and a pressure operating instruction of a revolution number control for said second driving source to individually supply thereto, or for singly supplying said pressure operating instruction of a torque control only to said first driving source and therefore being enabled to carry out synchronously or asynchronously the control of a torque or/and a revolution number, or error compensation based on deterioration or/and deformation of said elastic member or said belt or/and function adjustment for increasing and decreasing said elastic pressurizing force value.

2. The pulley press controlling apparatus according to claim 1, wherein said transmission has variable diameter pulleys of said shafts and while one of said pressure operating instructions is fixed as a constant value, is variably controlled by only the other.

3. The pulley press controlling apparatus according to claim 1, wherein said transmission has variable diameter pulley on said one of said shafts and is arranged a fixed speed ratio pulley on said other.

4. A pulley press controlling apparatus according to claim 1, wherein said control device compensates the variation of the friction force or the revolution number during operation resulting from a rise in peripheral temperature of said elastic member or said belt.

5. A pulley press controlling apparatus according to claim 1, wherein said transmission, one of said pressurizing devices at least has as said elastic member a dish or a wavy element and has a continuously linear characteristic formed by a characteristic of the compression pressure to the compression displacement.

6. A pulley press controlling apparatus according to claim 1, wherein said transmission is a continuously variable transmission or a constant speed ratio transmission in which said both pressurizing devices have a sliding mechanism for screw winding or fluid pressurizing.

7. A pulley press controlling apparatus according to claim 1, wherein said transmission is a continuously variable transmission for fulfilling a constant power transmission, a constant torque transmission or a single axial torque controlling transmission corresponding to a variety of instruction selected by said control device.

8. A pulley press controlling apparatus using an elastic member for a transmission comprising:

a belt wound to pulleys provided between a driving shaft and a driven shaft;

said pulleys on the driving side and on the driven side disposed oppositely to each other on said shafts and formed from a sliding disk and a fixed disk, respectively;

an elastic member;

a first pressurizing device for carrying out a torque control upon supplying an elastic pressurizing force to one of said pulleys so that a first, compression device generates compression in series with said elastic member;

a second pressurizing device for carrying out a revolution number control upon supplying a non-elastic pressurizing force generated by a second compression device to the other pulley;

an operating device having a first and a second driving source connected to said first and said second compression device, respectively to convert pressure operating instructions from electrical instructions to mechanical instructions said first pressurizing device having a first compression device for applying to said one of said pulleys the elastic pressurizing force generated compressing said elastic member by the sum displacement amounts of the movement displacement amount of said sliding disk of said one pulley and the compression displacement amount of said elastic member; and a control device for electrically dividing an input operating instruction into a pressure operating instruction for the elastic pressurizing force and a pressure operating instruction for the non-elastic pressurizing force to enable to individually supply synchronously or asynchronously therewith to said first and said second driving source, respectively.

9. A pulley press controlling apparatus according to claim 8, wherein said first pressurizing device is individually provided the compression device and/or its urging control device for obtaining said disk movement displacement amount and said elastic member compression displacement, respectively.

10. A pulley press controlling apparatus according to claim 8, wherein said control device provides as said pressure operating instruction for said elastic pressurizing force, the sum amount of said one pulley disk movement displacement and said elastic member compression displacement, or only the amount of said elastic member compression displacement to said first driving device.

11. A pulley press controlling apparatus according to claim 8, wherein said each operating device is comprising an error signal transmission impeding means for a pressure operating instruction between said each driving source and said each pressurizing device or between said first and said second pressurizing device.

12. A pulley press controlling apparatus using an elastic member comprising:
a belt wound to pulleys provided between a driving shaft and a driven shaft;
a variable diameter pulley provided on one or both of said shafts to slidably hold said belt between two disks;
a pressurizing device having a first compression device for applying an elastic pressurizing force to one of said variable diameter pulleys with an elastic member interposed in series and a second compression device for applying a non-elastic pressurizing force with an elastic member not interposed to another one of said variable diameter pulleys, and, in the alternative, having singly said first compression device for applying an elastic pressurizing force to said one of said variable diameter pulleys;
an operating device having a first and a second driving source connected respectively to said first and said second compression device, or said first driving source connected only to said first compression device;
a condition detecting means for sensing a detected value of frictional force by a pressure detector interposed and arranged between a transmission body and said elastic member or said compression device or/and a revolution number or a speed ratio determined between disk and said belt;
an error signal transmission impeding means provided in transmitting paths of pressure operating instructions and preventing error signals inflow and/or outflow in said pressurizing force;
a control device for supplying as a pressure operating instruction a desired pressurizing force selected value for applying a frictional pressurizing force or/and a revolution number or a speed ratio predetermined in a storage device in response to the input operating instruction; and
said control device having a processing unit for applying error compensation of said pressurizing force resulting from a deterioration in compression pressure of said elastic member or a deterioration or deformation in dimension of said belt or/and function adjustment for increasing and decreasing said pressurizing force value.

13. A pulley press controlling apparatus according to claim 12, wherein said condition detector is disposed as a pressure receiver for converting the pressurizing force into a flow medium pressure, and a strain gauge for converting said flow medium pressure, into an electric amount.

14. A pulley press controlling apparatus using an elastic member for a transmission comprising:
a belt wound to pulleys provided between a driving shaft and a driven shaft;
said pulleys on the driving side and on the driven side disposed oppositely to each other on said shafts and formed from a sliding disk and a fixed disk, respectively;
an elastic member;
a first pressurizing device for carrying out a torque control upon applying an elastic pressurizing force generated by compressing in series said elastic member to one of said sliding disks of said both pulleys;
a second pressurizing device for carrying out a revolution number control upon applying a non-elastic pressurizing force to the other;
a first and a second operating device including a first and a second driving source connected to said first and said second pressurizing device, respectively;
a condition detecting means for sensing detected values of a frictional force in said secondary pulley or/and a speed ratio or revolution numbers of said pulleys; and
a control device for supplying separately to said first and said second operating device each respective pressure operating instructions for a torque and a revolution member, or said each pressure operating instruction added to said each pressure operating instruction error compensation resulting from a deterioration in compression pressure or deformation in dimension of said elastic member or said belt in response to said detected value, or/and function adjustment for increasing and decreasing said pulley frictional force value so as to adjust a transmission efficiency, a transmission safety rate or to release a high compression pressure from said elastic member during stoppage of transmission.

15. A pulley press controlling apparatus according to claim 14, wherein a control device has a storage device in which a desired pressurizing force selected value for controlling a frictional pressurizing force or/and a speed ratio or a revolution number predetermined is/are supplied in response to the input operating instruction, and a processing unit for calculating an error compensation amount or/and an adjustment amount corresponding to said selected value and said detected value.

16. A pulley press controlling apparatus according to claim 14, wherein said control device compensates, as objects for compensation, an error compression pressure of said elastic member or an error dimension deformation of said belt based on an error in manufacture, an error in deterioration, or an error in peripheral temperature.

17. A pulley press controlling apparatus according to claim 14, wherein said control device is capable of selecting and providing in plural stages said compelled adjustment of said frictional force in the whole or partial region of the variable speed ratio region for said efficiency or said safety rate adjustment.

18. A pulley press controlling apparatus according to claim 14, wherein said control device strengthens said safety rate and said efficiency in the low speed region and the high speed region, respectively.

19. A pulley press controlling apparatus according to claim 14, wherein said control device sets the release pressure value Ps of said elastic member during a transmission stoppage to any lower pressure value within a compression displacement region $L_{02}$ or to a pressure release displacement $L_{03}$ for its exclusive use.

20. A pulley press controlling apparatus according to claim 14, wherein said control device, before or after the start of operation of said transmission and before or after the stop of operation, press-adjusts said elastic member in a pressure applying mode or a pressure removing mode.

21. A pulley press controlling apparatus according to claim 14, wherein said control device comprises a first control means for applying to said pressure operating instruction an error compensation amount based on said elastic member or said belt corresponding to an input operating instruction and a second control means for applying to said pressure operating instruction a function adjustment releasing a compression of said elastic member, so that said first control means executes said error compensation according to said condition detecting means while said second control means is operating said function adjustment.

* * * * *